US008319859B2

United States Patent
Kim et al.

(10) Patent No.: US 8,319,859 B2
(45) Date of Patent: Nov. 27, 2012

(54) DIGITAL CAMERA HAVING A VARIABLE FRAME RATE AND METHOD OF CONTROLLING THE DIGITAL CAMERA

(75) Inventors: Won-jung Kim, Suwon-si (KR); Kang-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 12/554,014

(22) Filed: Sep. 4, 2009

(65) Prior Publication Data

US 2010/0053345 A1  Mar. 4, 2010

(30) Foreign Application Priority Data

Sep. 4, 2008  (KR) .................. 10-2008-0087421

(51) Int. Cl.
*H04N 5/225* (2006.01)
*H04N 5/76* (2006.01)
(52) U.S. Cl. ................. 348/231.99; 348/220.1
(58) Field of Classification Search ............ 348/231.99, 348/231.2, 231.3, 231.6, 399.1, 699, 220.1
See application file for complete search history.

(56) References Cited

U.S. PATENT DOCUMENTS

2004/0236807 A1* 11/2004 Hsiung et al. ............... 708/200
2007/0104462 A1* 5/2007 Saito et al. ................. 386/112

* cited by examiner

*Primary Examiner* — Timothy J Henn
(74) *Attorney, Agent, or Firm* — Drinker Biddle & Reath LLP (57) ABSTRACT

A digital camera capable of variably setting a frame rate may include an imaging device which outputs a plurality of temporally continuous image frames when photographing a moving image. The digital camera may also include a digital signal processor that determines a frame rate with which the image frames are filed, wherein the digital signal processor variably determines the frame rate according to a motion speed of a subject in the frames. The digital camera may further include a recording medium in which the filed image frames are stored. Accordingly, as the frame rate is varied according to the motion of a subject, the motion of the subject can be smoothly realized in a high motion speed section from a reproduction perspective, and substantially repeated image frames can be removed in a low speed motion section. Thus, the size of moving image files can be reduced, saving memory resources.

15 Claims, 5 Drawing Sheets

DIGITAL CAMERA HAVING A VARIABLE FRAME RATE AND METHOD OF CONTROLLING THE DIGITAL CAMERA

CROSS-REFERENCE TO RELATED PATENT APPLICATION

This application claims the priority benefit of Korean Patent Application No. 10-2008-0087421, filed on Sep. 4, 2008 in the Korean Intellectual Property Office, the disclosure of which is incorporated herein in its entirety by reference.

BACKGROUND

1. Field of the Invention

The present invention generally relates to a digital camera, and more particularly, to a digital camera having a variable frame rate and method of controlling the same.

2. Description of the Related Art

In a moving image photographing mode of a typical digital camera, an imaging device captures an image of a subject using a lens group and photoelectrically converts the image of the subject into an electrical signal, and periodically outputs image frames to be displayed separately, according to a predetermined driving clock signal. The obtained image frames are temporarily stored in a buffer memory, and then encoded and filed according to a regulated compression encoding method, and sent to a recording medium and stored as a moving image file. A conventional digital camera typically files all of a plurality of image frames output from an imaging device with the same frame rate, and substantially similar image frames are typically recorded repeatedly when an image of a subject with relatively little motion is photographed. Thus, the storage of the substantially similar image frames consumes storage capacity.

SUMMARY

An exemplary digital camera may vary frame rates according to motion of a subject so that the motion of the subject is smoothly realized in a high speed motion section from a reproduction perspective, wherein substantially repeated image frames in a low speed motion section are removed, thereby reducing the data size of a moving image file and saving memory resources.

An exemplary digital camera may comprise an imaging device which outputs a plurality of temporally continuous image frames when photographing a moving image. The digital camera may also comprise a digital signal processor that determines a frame rate with which the image frames are filed, wherein the digital signal processor variably determines the frame rate according to a motion speed of a subject in the frames. The digital camera may further comprise a recording medium in which the filed image frames are stored.

The digital signal processor may comprise a motion vector calculating unit which calculates a frame motion vector from a previous frame and a current frame, and a frame rate determining unit which sets frame rates stepwise according to the calculated frame motion vector.

The motion vector calculating unit may average a plurality of local motion vectors calculated in the whole frame area of the previous and current frames when calculating the frame motion vectors.

The motion vector calculating unit may average a plurality of local motion vectors calculated in an auto focus (AF) area of the previous and current frames when calculating the frame motion vectors.

The frame rate determining unit may look up a data table containing the frame rates determined according to the frame motion vector, and may set an appropriate frame rate according to the lookup result.

The frame rate determining unit may set a high frame rate in a high speed motion section where motion of the subject is large, and reduce a frame rate in a low speed motion section where motion of the subject is small.

The digital signal processor may further comprise an encoding/filing process unit which collects a number of image frames corresponding to the determined frame rates and encodes the image frames.

The encoding/filing process unit may divide a plurality of frame sequences having different frame rates into file units to generate separate files.

The encoding/filing process unit may write a frame rate of a corresponding file in a header chunk of the generated files, and may write link information of a related file that is to be reproduced after a corresponding file, in an index chunk of the generated files.

A method of controlling a digital camera that generates a plurality of temporally continuous image frames when photographing a moving image and determining variable frame rates, with which the image frames are filed, according to a motion speed of a subject, comprises quantifying the motion speed of the subject in the frames, and determining the variable frame rates according to the motion speed of the subject.

The quantifying the motion speed may comprise searching for a pair of image blocks that match each other between a previous frame and a current frame, calculating local motion vectors from relative positions of the matching image blocks, and calculating a frame motion vector by averaging the local motion vectors calculated from the whole frame area or an auto focus (AF) area of the previous and current frames.

In the determining the variable frame rates, the frame rate may be set high in a high motion speed section where motion of the subject is large, and the frame rate may be reduced in a low motion speed section where the motion of the subject is small.

In the determining the variable frame rates, a data table containing the frame rates determined according to the frame motion vector, may be looked up, and an appropriate frame rate may be set according to the lookup result.

The method may further comprise collecting a number of image frames corresponding to the determined variable frame rates and encoding the image frames, and dividing a plurality of frame sequences having different frame rates into file units to generate separate moving image files.

The method may further comprise writing information about the frame rate of the corresponding file unit to the generated moving image files and link information of a related file that is to be reproduced after a corresponding file.

A method of controlling a digital camera may comprise restoring temporally continuous image frames by decoding stored moving image files, quantifying motion speed of a subject in the image frames, and determining variable frame rates with which the image frames are filed, according to the motion speed of the subject.

The quantifying the motion speed may comprise searching for a pair of image blocks that are matched between a previous frame and a current frame, calculating local motion vectors from relative positions of the matching image blocks, and calculating a frame motion vector by averaging the local motion vectors calculated from the whole frame area or an auto focus (AF) area of the previous and current frames.

In the determining the variable frame rates, the frame rate may be set high in a high motion speed section where motion of the subject is large, and the frame rate may be reduced in a low motion speed section where the motion of the subject is small.

In the determining the variable frame rates, a data table containing the frame rates determined according to the frame motion vector, may be looked up, and an appropriate frame rate may be set according to the lookup result.

The method may further comprise collecting a number of image frames corresponding to the determined variable frame rates and compressing and encoding the image frames, and dividing a plurality of frame sequences having different frame rates into file units to generate separate moving image files.

The method may further comprise writing information about the frame rate of the corresponding file to the generated moving image files and link information of a related file that is to be reproduced after a corresponding file.

BRIEF DESCRIPTION OF THE DRAWINGS

The above and other features and advantages of the present invention will become more apparent by describing in detail exemplary embodiments thereof with reference to the attached drawings as listed below.

DETAILED DESCRIPTION

Exemplary embodiments of the present invention will now be described more fully with reference to the accompanying drawings. In this specification, a digital camera refers to a digital mobile device having a proper photographing function, including not only a camera in the narrow sense classified simply by the form of a camera but also digital devices in the wider sense, having both portability and a photographing function, such as camcorders, mobile phones, personal digital assistants (PDAs), and so forth. Exemplary embodiments of the digital camera may file a series of moving image frames output from an imaging device, with variable frame rates, so that a reproduction motion of a subject can be smoothly realized in a high speed motion section and substantially repeated image frames are deleted in a low speed motion section, thereby saving memory resources.

Figure 1:
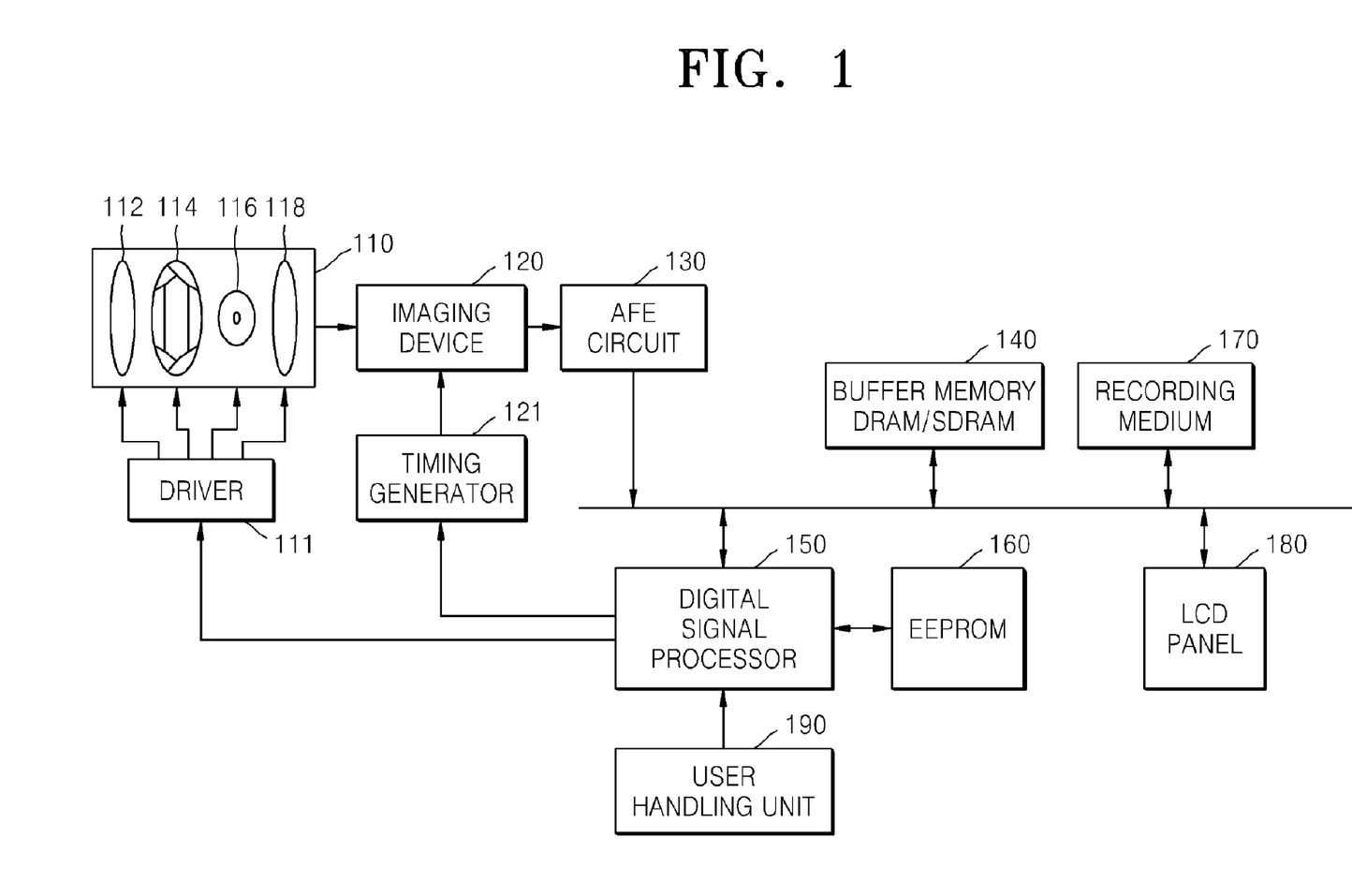
FIG. 1 is a block diagram of an exemplary digital camera.

FIG. 1 is a block diagram of an exemplary digital camera. The exemplary digital camera may include an optical unit 110 having a plurality of optical lenses arranged to form a subject image on an imaging surface, an imaging device 120 having the imaging surface and which converts the subject image that has passed through the optical unit 110 into an electrical image signal, an analog front end (AFE) circuit 130 which processes an output electrical image signal of the imaging device 120 to convert the output electrical image signal into a quantized digital image signal, a buffer memory 140 which temporarily stores an image signal (e.g., the quantized digital image signal) to provide a work space for signal processing, a recording medium 170 in which image data of the subject may be stored as a still image file or a moving image file, and a digital signal processor 150 which may collectively control the overall data flow and elements of the digital camera. The digital camera may further include a user handling unit 190 having a plurality of input mechanisms for sensing handling of the user as an input/output device and an LCD panel 180 that may receive an image signal from the digital signal processor 150 and display the image signal on a screen.

The optical unit 110 may include a zoom lens 112 which moves forward and backward along an optical axis and thereby varies a focal distance of a subject, a shutter 114 and an aperture 116 which adjust an exposure time of the imaging device 120 and incident light irradiated thereon, and a focus lens 118 which adjusts the focus of the subject image formed on the imaging device 120. The zoom lens 112, the shutter 114, the aperture 116, and the focus lens 118 may be driven by an actuating motor (not shown) which is driven using a driver 111.

The imaging device 120 may include a charged coupled device (CCD) image sensor or a complementary metal oxide semiconductor (CMOS) image sensor, and may convert the subject image which is incident by passing through the optical unit 110 into an electrical image signal. The operation of the imaging device 120 may be controlled by the digital signal processor 150 using a timing generator (TG) 121. The imaging device 120 may photograph both still images (static images) and moving images. When photographing a moving image, exposure to the imaging device 120 and data reading of image data to be displayed as a single display corresponding to one screen may be conducted according to a predetermined driving clock signal. This display obtained at predetermined time intervals may be referred to as a frame.

The AFE circuit 130 may conduct a sample holding using a correlated double sampling (CDS) method with respect to an output electrical image signal of the imaging device 120, so that a high signal-to-noise ratio is maintained. Also, the AFE circuit 130 may control gain of an image signal by using an auto gain control (AGC) method and conduct analog digital conversion (ADC), thereby converting an analog image signal output from the imaging device 120 into a quantized digital image signal. The quantized digital image signal may be stored in the buffer memory 140 in frame units.

The buffer memory 140 may include a non-volatile memory that provides a work space for various data processes, and may include a dynamic random access memory (DRAM) or a synchronous DRAM (SDRAM). The buffer memory 140 may temporarily store a series of moving image frames accumulated from a start of photographing in order to temporarily maintain moving image frames. At a completion of photographing, the moving image frames may be filed and permanently stored in the recording medium 170. Also, the buffer memory 140 may provide a work space for encoding and filing processes.

In an embodiment, image frames output from the imaging device 120 are not all encoded. In this regard, a degree of motion (e.g., a motion speed) of a subject may be first determined, and a number of image frames to be filed may be adjusted according to the determined motion of the subject, thereby varying the frame rate. Frame rate refers to a number of image frames that are collected per time unit to be filed among image frames that are continually output from the imaging device 120. More particularly, frame rate may be defined as the frequency at which frames are collected in a time unit, for example, per second, and is often expressed as frames per second (FPS). The operation of varying the frame rate may be controlled by the digital signal processor 150.

The digital signal processor 150 may execute a program recorded in an electronically erasable and programmable ROM (EEPROM) 160 to control the overall operations of the digital camera including image photographing and image data processing. In particular, the digital signal processor 150 may control the operation of varying the frame rate according to the motion speed of a subject. That is, the digital signal processor 150 may receive image frames output from the imaging device 120 and detect a motion vector of a subject using a previous frame and a current frame, thereby determining the degree of motion of the subject quantitatively. The digital signal processor 150 may delete substantially repeated frames and reduce the number of frames to be filed, in a low speed motion section where the motion of the subject is small. Consequently, the memory capacity required by the plurality of image frames can be reduced. On the other hand, in a high speed motion section where the motion of the subject is large, the number of frames to be filed may be set high so that motion of the subject can be smoothly realized from a reproduction perspective. For example, the number of frames to be filed may be close to or equal to the number of image frames output from the imaging device 120. The digital signal processor 150 may quantitatively determine the motion of the subject and file all of a plurality of image frames output from the imaging device 120 to increase the frame rate stored in the recording medium 170 (high speed motion section), or file only some of a plurality of image frames intermittently extracted from the image frames output from the imaging device 120 to reduce the frame rate stored in the recording medium 170 (low speed motion section).

Figure 2:
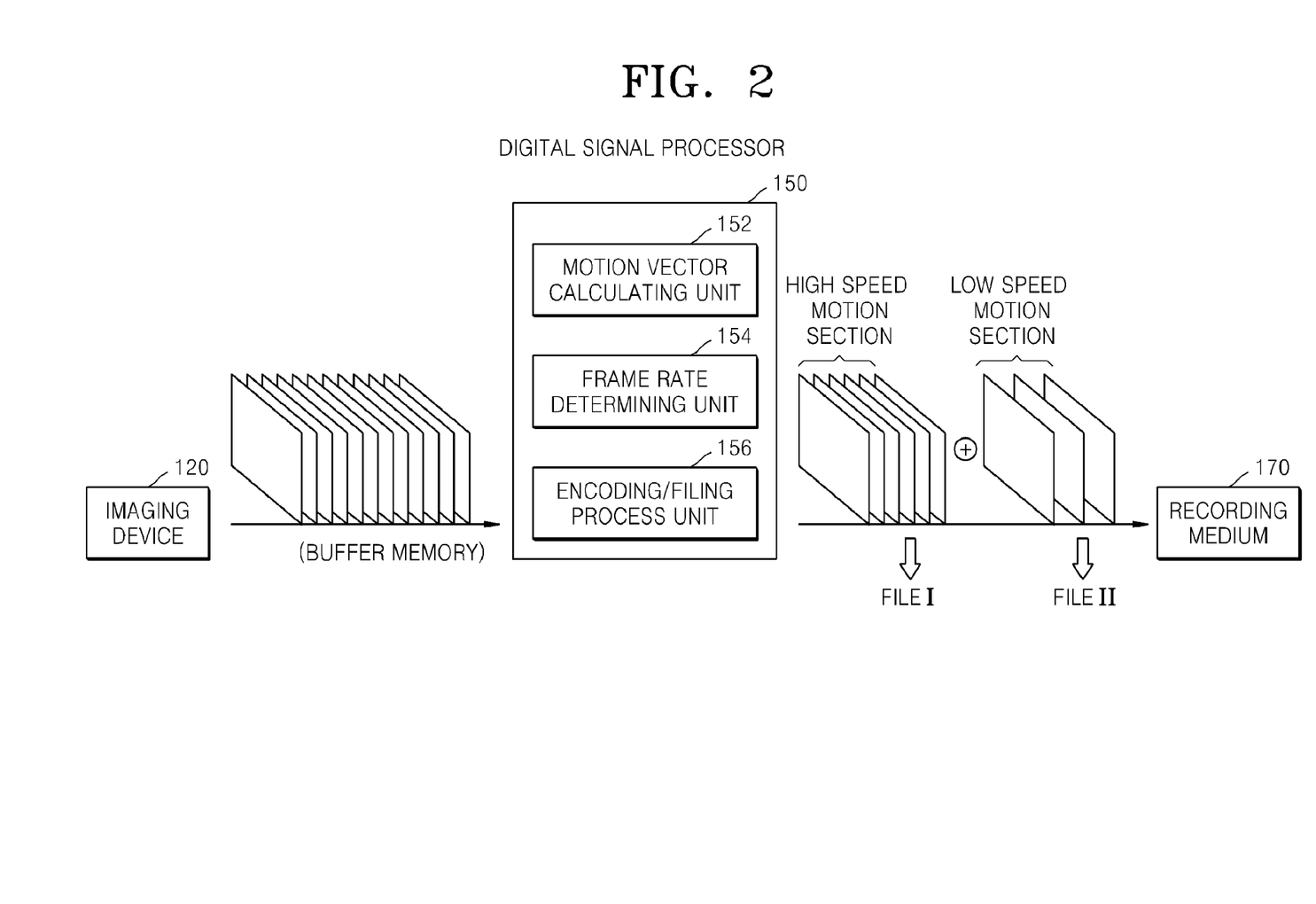
FIG. 2 is a diagram for explaining a frame rate varying operation of a digital signal processor of the exemplary digital camera illustrated in FIG. 1.

FIG. 2 is a diagram for explaining a frame rate varying operation of the digital signal processor 150 of the exemplary digital camera illustrated in FIG. 1. The digital signal processor 150 may include a motion vector calculating unit 152 which quantifies the degree of motion of a subject, a frame rate determining unit 154 which determines an appropriate frame rate according to the motion of the subject, and an encoding/filing process unit 156 which collects a number of frames corresponding to the determined frame rate and compresses and encodes the frames.

The motion vector calculating unit 152 may compare a previous frame with a current frame that are output from the imaging device 120 to find a pair of image blocks that match each other. Then the motion vector calculating unit 152 may calculate local motion vectors from the relative positions of the image blocks, and calculate a frame motion vector by averaging local motion vectors calculated from the whole frame area.

The frame rate determining unit 154 may determine an appropriate frame rate from the calculated frame motion vector, and for example, may determine an appropriate frame rate after looking up a data table linking frame motion vectors to frame rates. A high speed motion section where motion of the subject is large and a low speed motion section where motion of the subject is small may be handled differently according to the calculated frame motion vector. The frame rate may be higher in the high speed motion section than in the low speed motion section.

The encoding/filing process unit 156 may collect a number of image frames corresponding to the determined frame rate and convert the image frames into data encoded according to a certain compression method, such as a moving picture expert group (MPEG) method. The compressed image data may be transmitted to the recording medium 170 and stored as a moving image file. For example, in the high speed motion section, all of the image frames output from the imaging device 120 may be encoded and filed so that motion of the subject is smoothly realized in a reproduction image. In the low speed motion section, only some of the image frames may be collected among the image frames output from the imaging device 120 and encoded and filed, and substantially repeated frames may be removed, thereby saving memory resources of the recording medium 170.

From the perspective of reproduction of stored image frames, the inverse of the frame rate may be referred to as a continuation period during which a unit frame is reproduced. The continuation period may be reflected as a reproduction condition. Considering that one unified reproduction condition may be applied to one unit file from the start to the end of reproduction, and also considering compatibility with a general reproduction engine, the encoding/filing process unit 156 may store moving image frames of one photographing event not as a single file but as separate files having sections with different frame rates. That is, the encoding/filing process unit 156 may divide a continuous image flow output from the imaging device 120 into a low speed motion section and a high speed motion section, thereby filing the frames of the low speed motion section and the frames of the high speed motion section individually and storing them in the recording medium 170. Meanwhile, the encoding/filing process unit 156 may write information regarding the frame rate of a file in a header chunk of the file and link information about the reproduction sequence in an index chunk of the file. The frame rate reflected as a reproduction condition may be maintained constant while the file is being reproduced, and link information about the reproduction sequence of the file may preferably be recorded in addition to image data in order that a natural image flow can be realized by combining the moving files which are generated in a single photographing event but are divided into different file units. The reproduction engine may call and reproduce a next file with reference to the link information of a related file that is to be reproduced after a corresponding file.

Figure 3:
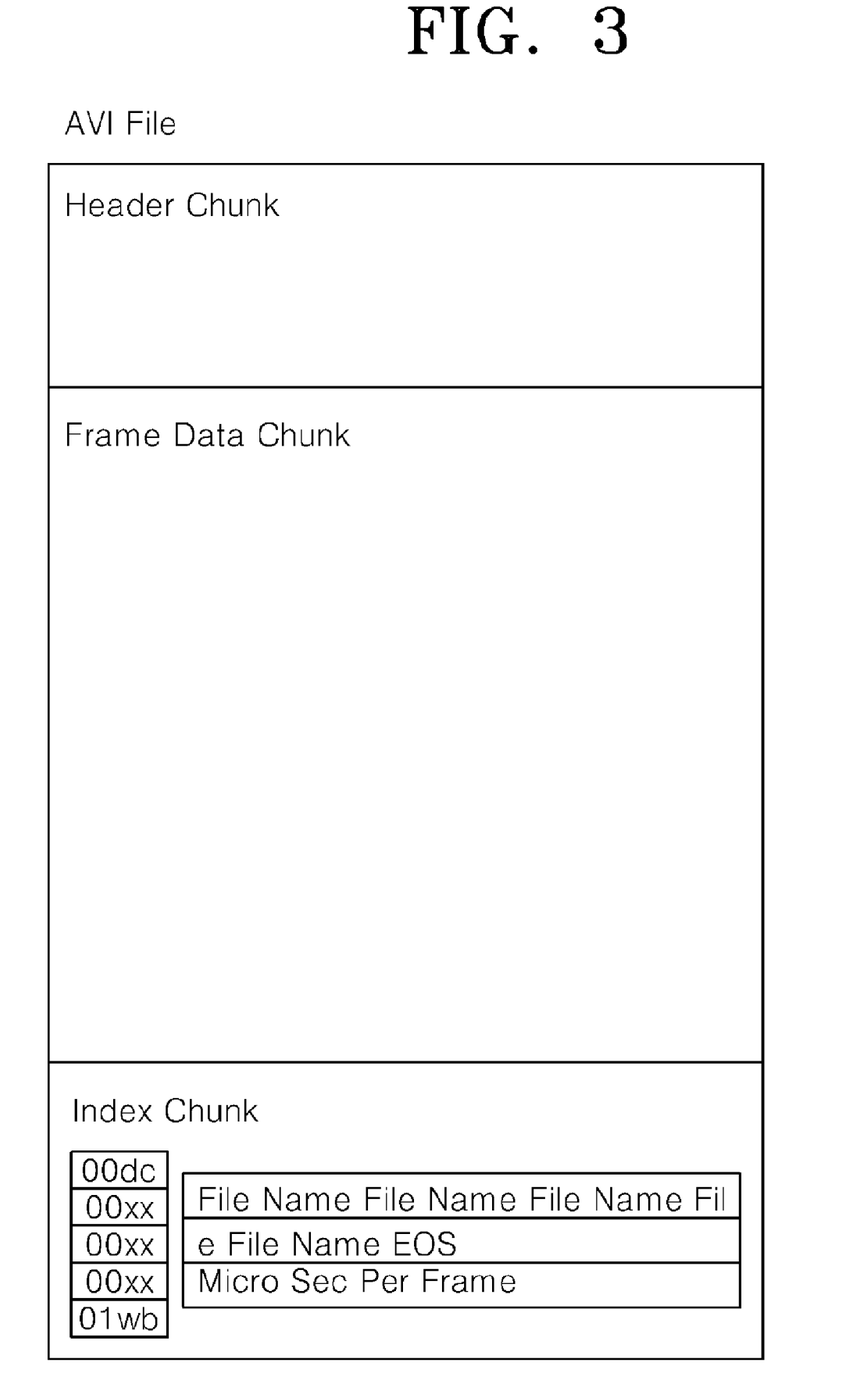
FIG. 3 illustrates an exemplary data structure of an audio video interleave (AVI) file as an example of a moving image file.

FIG. 3 illustrates an exemplary data structure of an audio video interleave (AVI) file as an example of a moving image file. The AVI file may include a frame data chunk in which a plurality of image frames are recorded, and a header chunk and an index chunk which are attached at the front and the end of the frame data chunk and in which photographing information and reproduction information of the image frames stored in the frame data chunk are recorded. Additional information related to the reproduction of a corresponding moving image file such as the frame rate, the frame size (i.e., the width and the height of the image frame), and the total number of frames may be recorded in the header chunk. Also, instead of the frame rate, the reproduction time per unit frame defined by the inverse of the frame rate may be recorded in the header chunk. In the index chunk, additional information about the reproduction sequence of the image frames stored in the frame data chunk may be recorded. In particular, link information (see index "00xx") about a related file which is to be reproduced after the current file, may be written to the index chunk in order to realize a continuous image flow by combining moving image files divided into different file units. For example, the file name of the related file and the frame rate of the related file or the reproduction continuation time, that is, microseconds (micro sec) per frame, of a unit frame may be written to the index chunk.

The reproduction engine may extract information about the frame rate from the header chunk to reflect the information as a reproduction condition, and the frame rate reflected as a reproduction condition may be maintained constant in a file unit. Also, in order that no blank space is generated between files before and after according to the reproduction sequence and thus a smooth image flow can be maintained, the reproduction engine may search the index chunk before reproduction of a file is completely finished, for example, when a plurality of remaining frames have yet to be reproduced, and extract link information and prepare the reproduction of a next moving image file.

Figure 4:
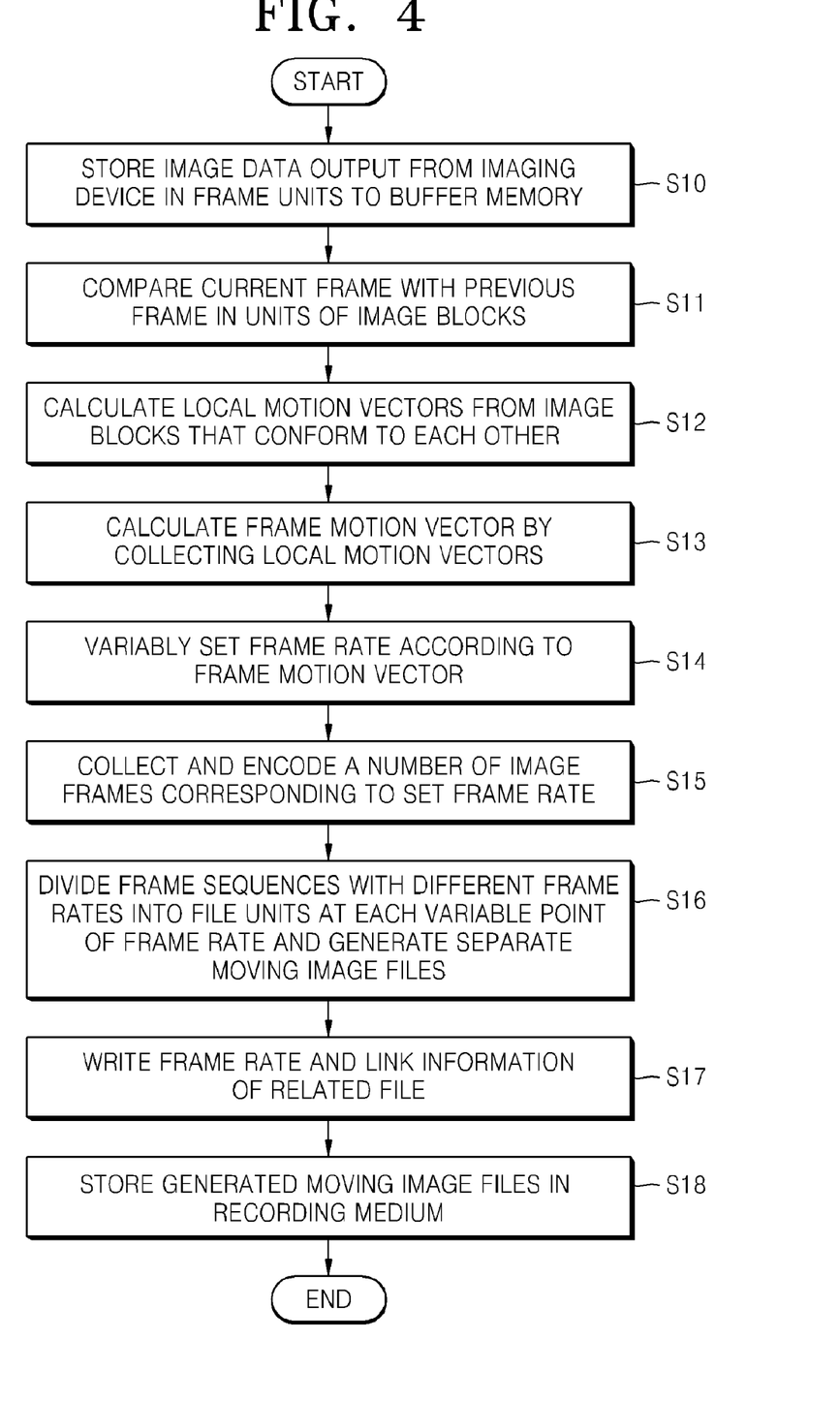
FIG. 4 is a flowchart illustrating exemplary control operations of a frame rate varying operation that is conducted according to the control of the digital signal processor of the exemplary digital camera illustrated in FIG. 1.

FIG. 4 is a flowchart illustrating exemplary control operations of a frame rate varying operation that is conducted according to the control of the digital signal processor 150 of the exemplary digital camera illustrated in FIG. 1. The digital signal processor 150 may temporarily store image data output from the imaging device 120 in frame units in the buffer memory 140 in an operation S10. The digital signal processor 150 may call image streams stored in the buffer memory 140 frame by frame, and conduct a block matching algorithm which compares a current frame and a previous frame, in image block units, to find a pair of matching blocks that conform to each other from the two frames in an operation S11. The digital signal processor 150 may calculate local motion vectors from the relative positions of the image blocks that conform to each other in an operation S12. Then a plurality of the local motion vectors calculated from the whole frame areas may be collected and averaged to calculate a frame motion vector in an operation S13. In order to reduce the burden of calculation, local motion vectors may not be calculated from the whole frame areas but from an auto focus (AF) area that has a high possibility of being a main subject and calculated and averaged to calculate a frame motion vector. The frame motion vector may be an example of a parameter introduced to quantify the motion of the subject between a previous frame and a current frame, but other appropriate parameters may also be used.

Next, the digital signal processor 150 may set an appropriate frame rate according to the calculated frame motion vector in an operation S14. The digital signal processor 150 may have a frame motion vector calculated from the image frames, search a data table, and set an appropriate frame rate with respect to a corresponding frame section. For example, the digital signal processor 150 may set frame rates varying stepwise, such as 15 FPS, 24 FPS, 30 FPS, and 60 FPS, with respect to divided frame sections from a low speed motion section where the motion of the subject is small, to a high speed motion section where the motion of the subject is large. As the frame rates are varied in multiple steps from the low speed motion section where the motion of the subject is small to the high speed motion section where the motion of the subject is large, substantially repeated frames may be deleted and the number of frames to be stored in the recording medium 170 may be reduced in the low speed motion section, thereby reducing a required memory capacity. On the other hand, in the high speed motion section where the motion of the subject is large, the number of frames to be stored in the recording medium 170 may be set high so that the motion of the subject is smoothly realized from a reproduction perspective. The data table may be used as an example of selecting an appropriate frame rate according to the motion of the subject, and alternatively, an appropriate frame rate may be calculated by obtaining motion vectors and using a calculation process.

Next, the digital signal processor 150 may call image data stored in the buffer memory 140 in units of frames and encode the image data. In an embodiment, not all of the stored image data may be encoded but a number of image frames corresponding to the previously set frame rate may be taken and encoded so as to reach the set frame rate in an operation S15. The increase or decrease of the image frames to be encoded may refer to the increase or decrease of the frame rates. For example, the digital signal processor 150 may take 15 image frames per second in a low speed motion section and encode the image frames with a frame rate of 15 FPS, and in a high speed motion section, the digital signal processor 150 may take 60 image frames per second and encode the image frames with a frame rate of 60 FPS.

The digital signal processor 150 may classify previous frames and subsequent frames according to differing frame rates, bundle them up as different files to generate a plurality of related files, bundle up a group of image frames having an identical frame rate as a single file unit, and store the file unit in the recording medium 170 in an operation S16. This may be for the purpose that the frame rate reflected as a reproduction condition within a file unit is maintained constant, and that the frame rates are unified in file units in order to correspond with the general reproduction conditions. Meanwhile, the digital signal processor 150 may store additional information required for reproduction in a moving image file. For example, information about the frame rate may be written to the header chunk of the moving image file, and link information of a related file about the reproduction sequence may be written to the index chunk in an operation S17. A moving image file generated in this manner may be stored in the recording medium 170 to complete the frame rate varying operation in an operation S18.

Figure 5:
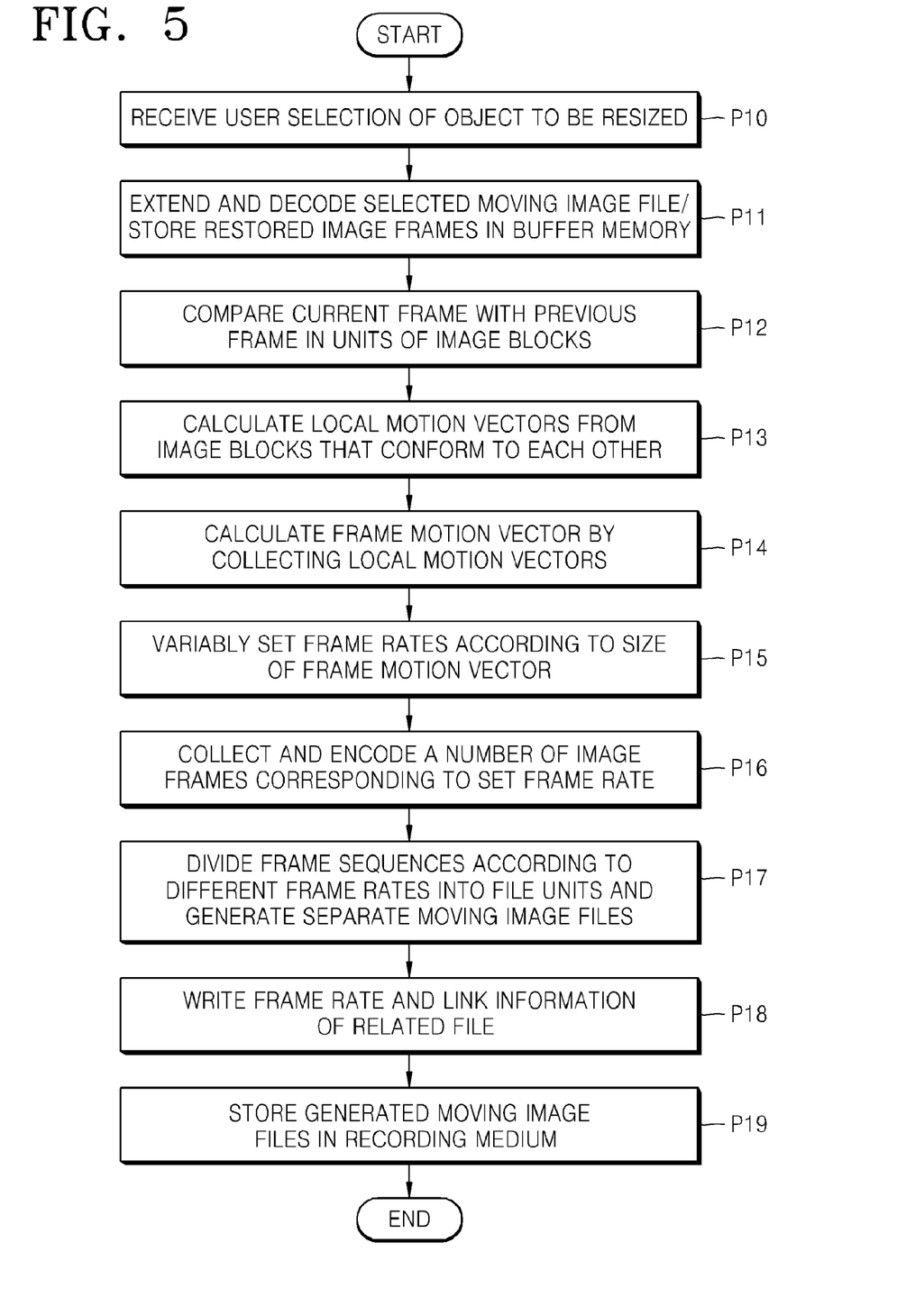
FIG. 5 is a flowchart illustrating exemplary control operations of a resizing operation conducted according to the control of the digital signal processor of the exemplary digital camera illustrated in FIG. 1.

FIG. 5 is a flowchart illustrating exemplary control operations of a resizing operation conducted according to the control of the digital signal processor 150 of the exemplary digital camera illustrated in FIG. 1. The exemplary control operations include calling a moving image file stored in the recording medium 170 to vary the frame rate. Resizing refers to a series of operations conducted upon request of the user to reduce the data size and free up memory capacity in order to efficiently use the storage space, and includes filing again a moving image file that is already stored in the recording medium 170 with a varying frame rate according to the motion of a subject.

First, the user may select an object to be resized and inform the digital signal processor 150 in an operation P10. The digital signal processor 150 may decode a selected moving image file, restore a moving image stream, and store the moving image stream in the buffer memory 140 temporarily in an operation P11. The digital signal processor 150 may call the moving image stream stored in the buffer memory 140 in frame units and compare a current frame and a previous frame in units of image blocks in an operation P12. The digital signal processor 150 may calculate local motion vectors of a subject in the previous and current frames in an operation P13. The digital signal processor 150 may calculate a frame motion vector by collecting local motion vectors calculated in the whole frame area or the AF region and averaging the local motion vectors in an operation P14. Next, the digital signal processor 150 may variably set a frame rate according to the calculated frame motion vector in an operation P15. For example, the digital signal processor 150 may look up a data table and set frame rates such as 15, 24, 30, and 60 FPS stepwise according to the lookup, with respect to frame sections that are divided according to the size of motion vectors from a low speed motion section where the motion of the subject is small to a high speed motion section where the motion of the subject is large.

Next, the digital signal processor 150 may call image data stored in the buffer memory 140 frame by frame, and encode an appropriate number of image frames corresponding to the previously set frame rate in an operation P16. Thus, in the low speed motion section, substantially repeated image frames may be deleted and the number of the frames to be recorded in the recording medium 170 may be reduced, thereby freeing up memory capacity. On the other hand, in the high speed motion section where the motion of the subject is large, the number of frames to be stored in the recording medium 170 may be set high relative to the low speed motion section, and thus the motion of the subject in the reproduction image can smoothly realized. The digital signal processor 150 may generate a plurality of related files by bundling up temporally continuous image frames at every varying point of the frame rate as different files in an operation P17. The digital signal processor 150 may generate a group of image frames having an identical frame rate as a single moving image file, and write additional information required for reproduction such as information about the frame rate and link information of a related file about the reproduction sequence to the moving image file in an operation P18. The moving image file generated in this manner may be stored in the recording medium 170, thus completing the frame rate varying operation in an operation P19.

In embodiments of the present invention, a series of moving image frames output from an imaging device may be filed having variable frame rates so that a reproduction mode of a subject may be smoothly connected in a high speed motion section where the motion of the subject is large and substantially repeated moving image frames may be deleted in a low speed motion section where the motion of the subject is small, thereby saving memory resources. Since the frame rate varying operation according to the motion of the subject may be used, a burden of calculation is small compared to a conventional compression method, and the file size can be reduced significantly. Also, as separate files may be generated for every section where the motion speed of the subject varies, a new file can be generated for each of a plurality of characteristic scenes, and a predetermined scene can be easily located among image records obtained from a single photographing event. In addition, just some images may be extracted and reproduced from the image records which are subdivided in file units.

A program for executing a method of controlling a digital camera as described herein may be stored in a computer readable storage medium. The program may include instructions executable by a processor such as the digital signal processor 150. The computer readable storage medium may include the buffer memory 140, the recording medium 170, or the EEPROM 160 illustrated in FIG. 1. The computer readable storage medium may include memory implemented in an integrated circuit (e.g., random access memory (RAM), read-only memory (ROM), erasable programmable read only memory (EPROM), static RAM (SRAM), or flash memory), a magnetic storage medium (e.g., floppy disk or hard disk), or an optical storage medium (e.g., compact disc (CD or CD-ROM) or digital versatile disc (DVD or DVD-ROM)).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A digital camera comprising:
    an imaging device which outputs a plurality of temporally continuous image frames when photographing a moving image;
    a digital signal processor that determines a frame rate with which the image frames are filed, wherein the digital signal processor variably determines the frame rate according to a motion speed of a subject in the frames; and
    a recording medium in which the filed image frames are stored,
    wherein the digital signal processor comprises:
        a motion vector calculating unit which calculates a frame motion vector from a previous frame and a current frame;
        a frame rate determining unit which sets frame rates stepwise according to the calculated frame motion vector; and
        an encoding/filing process unit which collects a number of image frames corresponding to the determined frame rates and encodes the image frames, wherein the encoding/filing process unit divides a plurality of frame sequences having different frame rates into file units to generate separate files.

2. The digital camera of claim 1, wherein the motion vector calculating unit averages a plurality of local motion vectors calculated in the whole frame area of the previous and current frames when calculating the frame motion vectors.

3. The digital camera of claim 1, wherein the motion vector calculating unit averages a plurality of local motion vectors calculated in an auto focus (AF) area of the previous and current frames when calculating the frame motion vectors.

4. The digital camera of claim 1, wherein the frame rate determining unit looks up a data table containing the frame rates determined according to the frame motion vector.

5. The digital camera of claim 1, wherein the frame rate determining unit increases a frame rate in a high speed motion section where motion of the subject is large, and reduces a frame rate in a low speed motion section where motion of the subject is small.

6. The digital camera of claim 1, wherein the encoding/filing process unit writes a frame rate of a corresponding file in a header chunk of the generated files.

7. The digital camera of claim 1, wherein the encoding/filing process unit writes link information of a related file that is to be reproduced after a corresponding file, in an index chunk of the generated files.

8. A method of controlling a digital camera that generates a plurality of temporally continuous image frames when photographing a moving image and determining variable frame rates, with which the image frames are filed, according to a motion speed of a subject, the method comprising:
    quantifying the motion speed of the subject in the frames;
    determining the variable frame rates according to the motion speed of the subject; and
    collecting a number of image frames corresponding to the determined variable frame rates and encoding the image frames, and dividing a plurality of frame sequences having different frame rates into file units to generate separate moving image files.

9. The method of claim 8, wherein the quantifying the motion speed comprises:
    searching for a pair of image blocks that match each other between a previous frame and a current frame;

calculating local motion vectors from relative positions of the matching image blocks; and calculating a frame motion vector by averaging the local motion vectors calculated from the whole frame area or an auto focus (AF) area of the previous and current frames.

10. The method of claim 8, wherein, in the determining the variable frame rates, the frame rate is set high in a high motion speed section where motion of the subject is large, and the frame rate is reduced in a low motion speed section where the motion of the subject is small.

11. The method of claim 8, wherein, in the determining the variable frame rates, a data table containing the frame rates determined according to the frame motion vector, is looked up.

12. The method of claim 8, further comprising writing information about the frame rate of the corresponding file unit to the generated moving image files and link information of a related file that is to be reproduced after a corresponding file.

13. A method of controlling a digital camera that generates a plurality of image frames at a first frame rate when capturing a moving image, the method comprising:

determining second and third frame rates based on a motion speed detected in the image frames;

storing a first plurality of the image frames corresponding to the second frame rate in a first file; and storing a second plurality of the image frames corresponding to the third frame rate in a second file.

14. The method of claim 13, wherein the second and third frame rates are different than the first frame rate.

15. The method of claim 13, wherein the second and third frame rates are different, and the second frame rate is the same as the first frame rate.

* * * * *